US 7,003,358 B2

(12) United States Patent
Eastty et al.

(10) Patent No.: US 7,003,358 B2
(45) Date of Patent: Feb. 21, 2006

(54) AUDIO SIGNAL PROCESSORS

(75) Inventors: Peter Charles Eastty, Eynsham (GB);
Peter Damien Thorpe, Botley (GB);
Christopher Sleight, Chipping Norton (GB)

(73) Assignee: Sony United Kingdom Limited, Weybridge (GB)

( * ) Notice: Subject to any disclaimer, the term of this patent is extended or adjusted under 35 U.S.C. 154(b) by 215 days.

(21) Appl. No.: 10/621,764

(22) Filed: Jul. 17, 2003

(65) Prior Publication Data

US 2004/0017923 A1    Jan. 29, 2004

Related U.S. Application Data

(63) Continuation of application No. 09/177,944, filed on Oct. 23, 1998, now abandoned.

(30) Foreign Application Priority Data

Oct. 19, 1997   (GB) .................................. 9722526

(51) Int. Cl.
*G06F 17/00*   (2006.01)
(52) U.S. Cl. .................... 700/94; 381/98; 330/251; 330/207 A
(58) Field of Classification Search ............... 381/103, 381/106, 98, 117, 77; 333/14; 700/94; 330/10, 330/207 A, 251
See application file for complete search history.

(56) References Cited

U.S. PATENT DOCUMENTS 5,754,666 A     5/1998 Nakagawa .................... 381/98
5,946,402 A *   8/1999 Nishio et al. ................ 381/103

FOREIGN PATENT DOCUMENTS

GB     2 181 626       4/1987
WO     WO 98 07234     2/1998

OTHER PUBLICATIONS

Leung et al., "A 5 V, 118 db / spl Sigma//spl Delta/analog-to-digital converter for wideband digital audio," Digest of Technical Papers of the 1997 IEEE International Conference on Solid-State Circuits, San Francisco, Feb. 6-8, 1997, pp. 218-219 and 460.

* cited by examiner

*Primary Examiner*—Xu Mei
(74) *Attorney, Agent, or Firm*—Frommer Lawrence & Haug LLP; William S. Frommer; Thomas F. Presson

(57) ABSTRACT

An audio signal processor which modifies audio signal components outside the conventional audio frequency band. The processor includes a Delta Sigma Modulator (DSM) that receives a non-interpolated digital audio signal sampled at a frequency of at least 198 kHz.

16 Claims, 2 Drawing Sheets

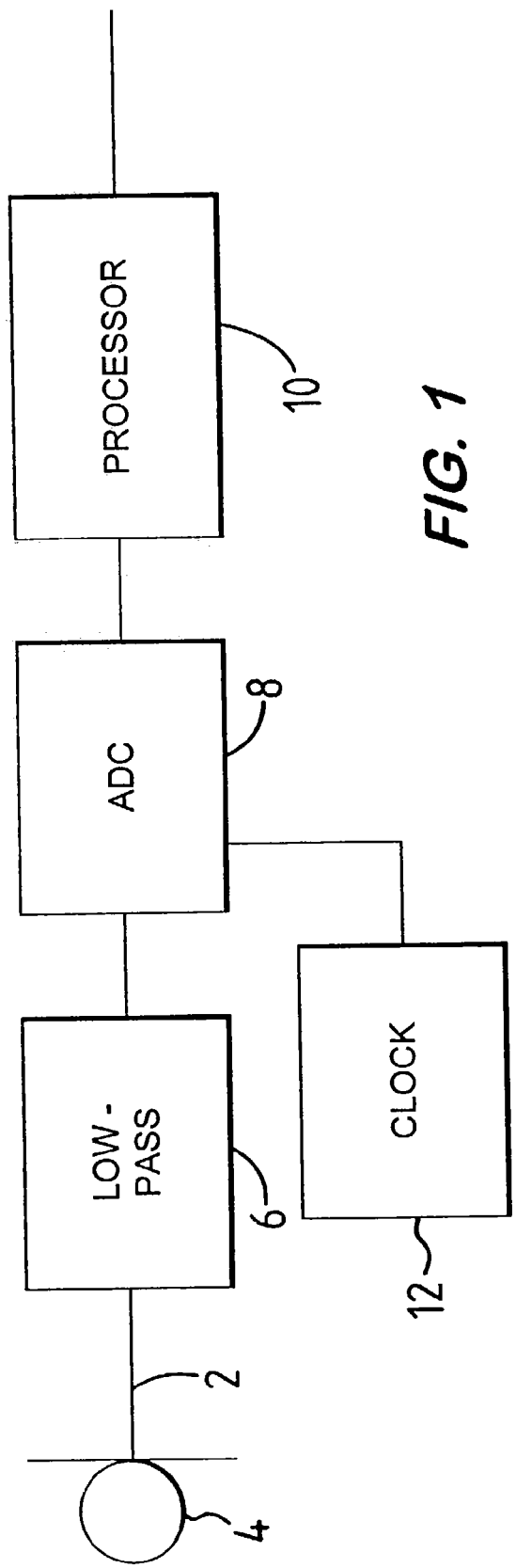
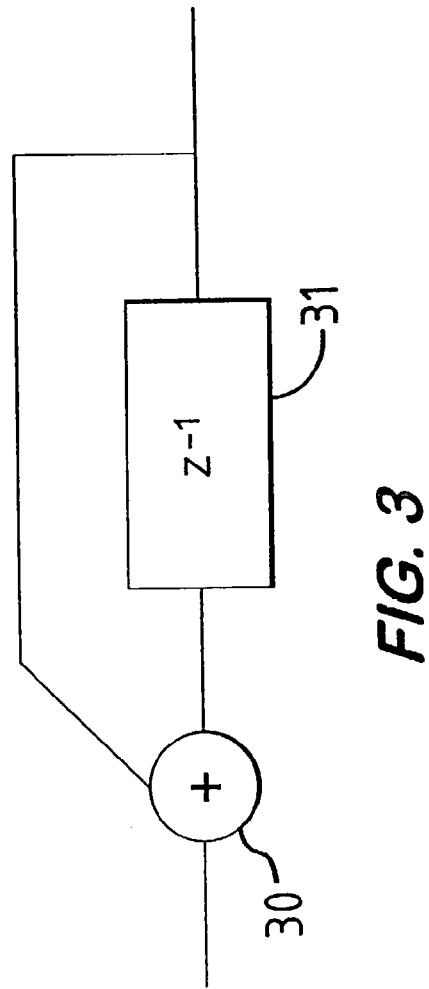

AUDIO SIGNAL PROCESSORS

CROSS-REFERENCE TO RELATED APPLICATIONS

This application is a continuation application of U.S. patent application Ser. No. 09/177,944, filed Oct. 23, 1998 now abandoned.

BACKGROUND OF THE INVENTION

1. Field of the Invention

The present invention relates to audio signal processors.

2. Description of the Prior Art

Conventionally the audio band is deemed to be about DC to about 20 KHz and frequencies above that range are ignored as inaudible. In fact the audio band rolls off, rather than abruptly ending at 20 KHz, and some people with expert listening skills consider that frequencies above 20 KHz are audible or at least consider that they can hear the effects in the audible frequency band of frequency components outside that conventional band. In other words, frequencies above 20 kHz may affect elements of the audio response in the conventional audio band.

SUMMARY OF THE INVENTION

According to the present invention, there is provided an audio signal processor which modifies audio signal components not only in the conventional audio band but also in the range of frequencies from the conventional upper limit of the conventional audio band to frequencies greater than 24 kHz.

The conventional audio band is the range of frequencies from DC to 20 kHz or from about 20 Hz to 20 kHz. Whilst DC is inaudible, some audio signal processors have a frequency response down to DC.

The said range of frequencies above 20 kHz may extend to an upper limit of 30 khz or to 50 kHz or to 100 kHz. The processor of the invention is able to modify components in the whole of the band from DC or 20 Hz to the upper limit e.g. 100 kHz. The modification may be equalization such as gain control, frequency dependent gain control, frequency/phase characteristic control or any other form of modification conventional in the art.

It may be observed that some prior audio processors include transmission channels of bandwidth extending beyond 20 kHz but that prior audio processors do not modify audio signals outside the conventional audio band as far as is known to the present inventor.

In an embodiment of the present invention, the said audio components are sampled and digitized to produce digital audio components.

In a preferred embodiment of the invention, the audio signal components are sampled and digitized as 1-bit signals at a sampling rate of: e.g. 198 kHz or greater; or 1.4 MHz or greater; or preferably about 2.85 MHz e.g. 2.8224 MHz (64×44.1 kHz).

In the preferred embodiment, the processor includes a 1-bit Delta Sigma Modulator (DSM). The DSM may be a filter and/or a gain control and/or a signal adder or mixer. An example of a DSM is described hereinbelow.

The invention provides audio signal processing of very high quality. Although it appears unnecessary, according to conventional practice, to equalise over such wide frequency bands and at such high sampling rates as are used in the embodiments of the invention it is believed that so doing contributes to the fidelity of the processed audio signal.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1 is a block diagram of an audio signal processor according to the present invention;

FIG. 3 is a schematic block diagram of an integrator of the mixer of FIG. 2.

DESCRIPTION OF THE PREFERRED EMBODIMENTS

Figure 2:
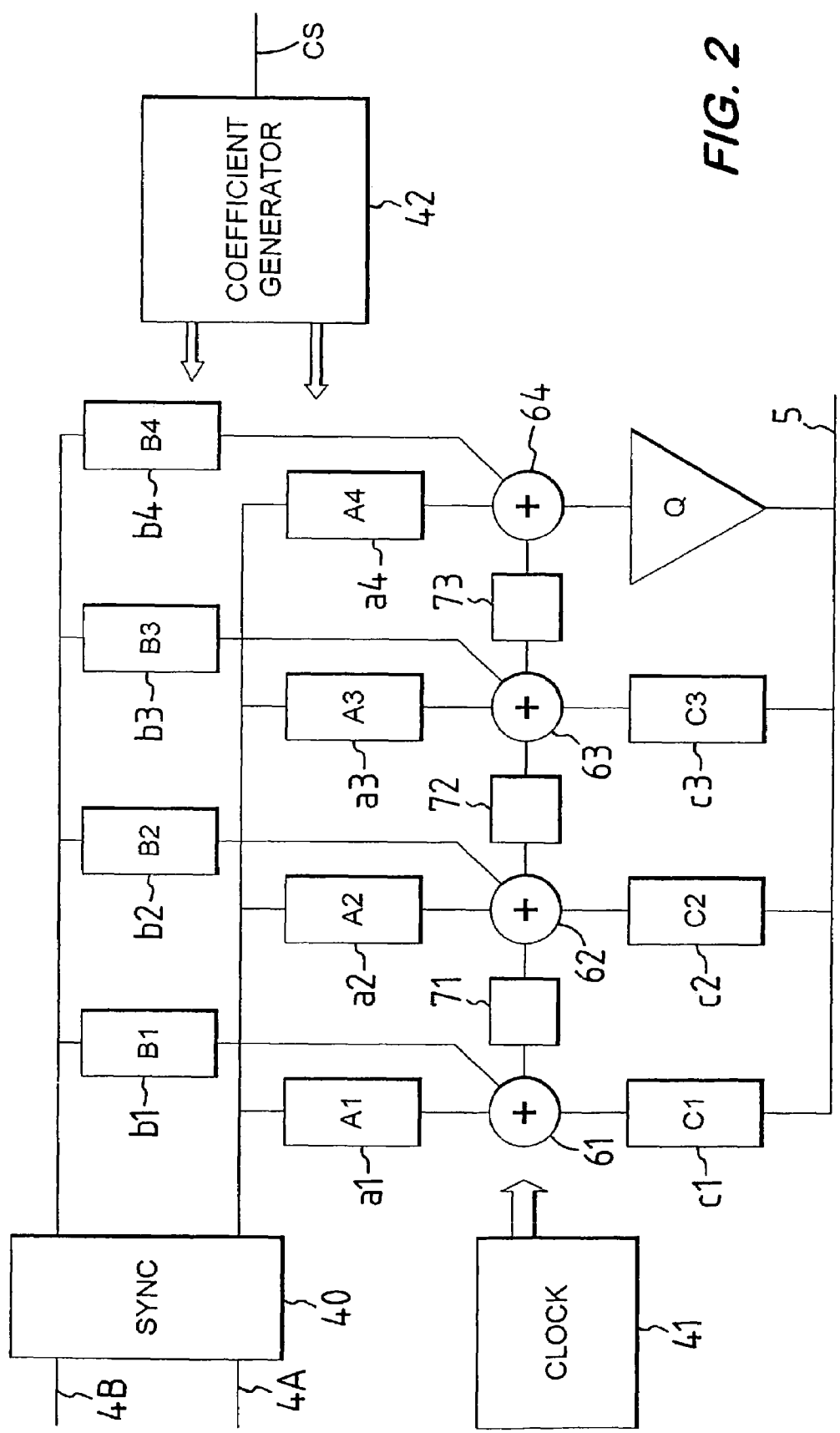
FIG. 2 is a schematic block diagram of an illustrative 1-bit audio signal mixer useful in the processor of FIG. 1.

Referring to FIG. 1, an audio signal processor has an input 2 for receiving audio signals from for example a stereo pair of microphones 4. An anti-aliasing low-pass filter 6 passes signal components in the range of about DC to about 100 kHz. The audio signals are sampled and digitized in an analogue to digital converter ADC 8.

The converter may be an n-bit converter where n is greater than one, e.g. 16 as is conventional in digital audio. The ADC 8 samples the signal at a suitable sample rate for n-bit digitization. The sample rate is set by a clock 12.

Preferably the converter 8 is a 1-bit converter. It may have a sampling rate of 198 kHz or greater than 1.4 Mhz preferably 2.8224 MHz.

The digital signals are then modified in a processor such as an equalizer 10 which is able to modify over the whole frequency range not just in the conventional audio band.

The processor 10 may be for example:
an equalizer;
a digital signal mixer;
a processor which encodes audio signals for storage;
a processor which encodes audio signals for transmission; and/or
a processor which encodes audio signals for recording on a medium such as a CD.

The processor would be an n-bit processor if n-bit signals are produced by the converter 8.

Preferably the converter 8 is a 1-bit converter and the processor 10 is a 1-bit processor. An example of a processor is a signal mixer. In the case of a signal mixer the mixer has a plurality of inputs each of which receives an audio signal having components in the range DC to greater than 24 kHz as described above.

An example of a 1-bit audio signal mixer is shown in FIG. 2 and is described in more detail in co-pending UK patent application 9624671.5 (I-96-24, S96P5063 GB00, P/1509) incorporated herein by reference.

Referring to FIG. 2, the signal combiner comprises an nth order Delta-Sigma Modulator (DSM) where $\underline{n}$ is 1 or more. The example shown in a third order DSM (n=3) but $\underline{n}$ may be greater than 3.

The order of the DSM is defined by the number of integrator sections. In the DSM of FIG. 2, there are two inputs 4A and 4B for receiving first and second 1-it input signals. The DSM has: n integrator stages comprising a first stage and n−1 intermediate stages; and a final stage. The first stage comprises a three input adder 61, a first 1-bit multiplier $a_1$ connected to the first input 4A of the DSM a second 1-bit multiplier $b_1$ connected to the second input 4B of the DSM, a third 1-bit multiplier connected to the output of the DSM, and an integrator 71. The first, second and third multipliers $a_1$, $b_1$, $c_1$, multiply a 1-bit signal by coefficients A1, B1 and C1 respectively. Each intermediate stage comprises: an adder 62, 63 having four inputs; an integrator 72, 73; a first coefficient multiplier $a_2$, $a_3$ connected to the first input of the DSM for multiplying the first 1-bit signal by a coefficient A1, A2, A3; a second coefficient multiplier $b_2$,$b_3$ connected to a second input of the DSM for multiplying the second 1-bit signal by a coefficient B1, B2, B3; and a third coefficient multiplier $c_2$, $c_3$ connected to a the output of the DSM for multiplying the 1-bit output signal of the DSM by a third coefficient C2, C3. The adder of each stage adds the output of the integrator of the preceding stage to the output of each 1-bit multiplier connected thereto.

The final stage of the DSM comprises an adder 64 having three inputs; a first coefficient multiplier $a_4$ for multiplying the first signal by a first coefficient A4; a second coefficient multiplier b4 for multiplying the second signal by a second coefficient B4. The adder 64 adds the output of the integrator 73 of the preceding stage to the outputs of the multipliers a4 and b4. The adder 64 has an output connected to a quantizer Q.

The multipliers $a_1$ to $a_1$, $b_1$ to $b_4$ and $c_1$ to $c_4$ are all 1-bit multipliers, which multiply each bit of the 1-bit signals applied to them by p bit coefficients to produce p bit multiplicands.

The adders 61 to 64 and the integrators 71 to 73 operate on the p bit signals.

The p bit signals are represented in twos complement form for example whereby positive and negative numbers are represented.

The quantizer Q is a comparator having a threshold level of zero. Negative inputs to the quantizer are encoded as −1 (logic 0) and positive inputs as +1 (logical 1), to produce the 1-bit output at output 5.

The first and second 1-bit signals are applied to inputs 4A and 4B. A synchronisation circuit 40 is provided to synchronise the first and second signals to a local clock provided by a clock circuit 41. The synchronisation circuit may separately synchronize the two input signals to the local clock. Clock circuit 41 also controls the clocking of the DSM.

The coefficients A1 to A4, B1 to B4 and C1 to C3 may be chosen using the method described in Annex A to provide
a) circuit stability; and
b) noise shaping.

The coefficients C1 to C3 have fixed values to provide the noise shaping.

The coefficient A1 to A6 and B1 to B4 define zeros of the transfer function of the input signals and thus control the gain applied to the signals.

In accordance with one embodiment of the present invention, the coefficients A1 to A4 and B1 to B4 are chosen to sum the first and signals in fixed proportions defined by the coefficients. Thus coefficients A1 to A4 may be different from B1 to B4. The coefficients A1 to A4 may equal corresponding coefficients B1 to B4.

In accordance with another embodiment of the present invention, the coefficients A1 to A4 and B1 to B4 are variable to allow the first and second signals to be mixed in variable proportions. The variable coefficients A1 to A4, B1 to B4 are generated by a coefficient generator 42. Generator 42 may be a coefficient store, storing sets of coefficients which are addressed by a variable addressing arrangement responsive to a control signal CS.

Alternatively the coefficients generator 42 maybe a micro computer which generates the coefficients in response to a control signal.

FIG. 3 shows, schematically, an example of an integrator 71,72,73. It comprises an adder 30 and a 1-bit delay 31 with a feedback path from the output of the delay to an input of the adder. Thus the output of the delay is added to the signal input to the adder. The adder 30 may be separate from, or implemented by, the adder 61,62,63.

In a modification of the DSM of FIG. 3, the second input 4B and the coefficient multipliers B1,B2, B3, B4 are omitted.

The coefficients A1 to A4 (and B1 to B4 if provided) may be chosen to apply a predetermined filter characteristic to the signal in addition to noise shaping.

The microphone 4 of FIG. 1 has a bandwidth which is at least DC to greater than 24 kHz.

The microphone 4 may be replaced by another audio signal source able to produce signal components in the bandwidth of at least DC to greater than 24 kHz. The source may be an audio recorder/reproducer.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Calculating Coefficients

This annex outlines a procedure for analysing a fifth order DSM and for calculating coefficients of a desired filter characteristic.

A fifth order DSM is shown in FIG. A having coefficients a to f and A to E, adders 6 and integrators 7. Integrators 7 each provide a unit delay. The outputs of the integrators are denoted from left to right s to w. The input to the DSM is a signal x[n] where [n] denotes a sample in a clocked sequence of samples. The input to the quantizer Q is denoted y[n] which is also the output signal of the DSM. The analysis is based on a model of operation which assumes quantizer Q is simply an adder which adds random noise to the processed signal. The quantizer is therefore ignored in this analysis.

The signal y[n]=fx[n]+w[n] i.e. output signal y[n] at sample [n] is the input signal x[n] multiplied by coefficient f plus the output w[n] of the preceding integrator 7.

Applying the same principles to each output signal of the integrators 7 results in Equations set 1.

$$y[n] = fx[n] + w[n]$$
$$w[n] = w[n-1] + ex[n-1] + Ey[n-1] + v[n-1]$$
$$v[n] = v[n-1] + dx[n-1] + Dy[n-1] + u[n-1]$$
$$u[n] = u[n-1] + cx[n-1] + Cy[n-1] + t[n-1]$$
$$t[n] = t[n-1] + bx[n-1] + By[n-1] + s[n-1]$$

$$s[n] = s[n-1] + ax[n-1] + Ay[n-1]$$

These equations are transformed into z-transform equations as well known in the art resulting in equations set 2.

$$Y(z) = fX(z) + W(z)$$

$$W(z)(1-z^{-1}) = z^{-1}(eX(z) + EY(z) + V(z))$$

$$V(z)(1-z^{-1}) = z^{-1}(dX(z) + DY(z) + U(z))$$

$$U(z)(1-z^{-1}) = z^{-1}(cX(z) + CY(z) + T(z))$$

$$T(z)(1-z^{-1}) = z^{-1}(bX(z) + BY(z) + S(z))$$

$$S(z)(1-z^{-1}) = z^{-1}(aX(z) + AY(z))$$

The z transform equations can be solved to derive Y(z) as a single function of X(z) (Equation 3)

$$Y(z) = fX(z) + \frac{z^{-1}}{(1-z^{-1})}\left(eX(z) + EY(z) + \frac{z^{-1}}{1-z^{-1}}\left(dX(z) + DY(z) + \frac{z^{-1}}{1-z^{-1}}\left(cX(z) + CY(z) + \frac{z^{-1}}{1-z^{-1}}\left(bX(z) + BY(z) + \frac{z^{-1}}{1-z^{-1}}(aX(z) + AY(z))\right)\right)\right)\right)$$

This may be reexpressed as shown in the right hand side of the following equation, Equation 4. A desired transfer function of the DSM can be expressed in series form $$\frac{Y(z)}{X(z)}$$

given in left hand side of the following equation and equated with the tight hand side in Equation 4.

$$\frac{Y(z)}{X(z)} = \frac{\alpha_0 + \alpha_1 z^{-1} + \alpha_2 z^{-2} + \alpha_3 z^{-3} + \alpha_4 z^{-4} + \alpha_5 z^{-5}}{\beta_0 + \beta_1 z^{-1} + \beta_2 z^{-2} + \beta_3 z^{-3} + \beta_4 z^{-4} + \beta_5 z^{-5}} =$$

$$\frac{f(1-z^{-1})^5 + z^{-1}e(1-z^{-1})^4 + z^{-2}d(1-z^{-1})^3 + z^{-3}c(1-z^{-1})^2 + z^{-4}b(1-z^{-1}) + z^{-5}a}{(1-z^{-1})^5 - z^{-1}E(1-z^{-1})^4 - z^{-2}D(1-x^{-1})^3 - z^{-3}C(1-z^{-1})^2 - z^{-4}B(1-z^{-1}) - Z^{-5}A}$$

Equation 4 can be solved to derive the coefficients f to a from the coefficients $\alpha_0$ to $\alpha_5$ as and coefficients E to A from the coefficients $\beta_0$ to $\beta_5$ as follows noting that the coefficients $\alpha_n$ and $\beta_n$ are chosen in known manner to provide a desired transfer function.

f is the only $z^0$ term in the numerator. Therefore $f=\alpha_0$.

The term $\alpha_0(1-z^{-1})^5$ is then subtracted from the left hand numerator resulting in $\alpha_0 + \alpha_1 z^{-1} \ldots + \ldots \alpha_5 z^{-5} - \alpha_0(1-z^{-1})^5$ which is recalculated.

Similarly $f(1-z^{-1})^5$ is subtracted from the right hand numerator. Then e is the only $z^{-1}$ term and can be equated with the corresponding $\alpha_1$ in the recalculated left hand numerator.

The process is repeated for all the terms in the numerator.

The process is repeated for all the terms in the denominator.

We claim:

1. An audio signal processor which modifies audio signal components not only in the conventional audio frequency band but also in the range of frequencies from about the upper limit of the conventional audio band to greater than 24 kHz;

whereby the audio signal processor comprises a Delta Sigma Modulator (DSM) that receives a non-interpolated digital audio signal sampled at a frequency of at least 198 kHz;

wherein the audio components are converted to 1-bit signals using a sampling rate in the range 198 kHz to about 2.85 MHz;

wherein said DSM is a one bit DSM for modifying the signal components; and wherein the said DSM is an nth-order (where n is greater than or equal to 1) Delta Sigma Modulator (DSM) having an input for receiving a first 1-bit signal, a quantizer for requantizing a p bit signal to 1-bit from the requantized signal being the output signal of the processor, a plurality of signal combiners including a first combiner for forming an integral of an additive combination of the product of the first signal and a first coefficient coefficient and of the product of the output signal and a second coefficient, at least one intermediate combiner for forming an integral of an additive combination of the product of the first signal and a first coefficient and of the product of the second signal and the output signal and of the integral of the preceding stage, and a final combiner for forming an additive combination of the product of the first signal and a first coefficient and of the integral of the preceding stage to form the said p bit signal which is requantized by the quantizer.

2. The processor according to claim 1, wherein the conventional audio band is about DC to about 20 kHz.

3. The processor according to claim 1, wherein the conventional audio band is about 20 Hz to about 20 kHz.

4. The processor according to claim 1, wherein the said range of frequencies extends to about 30 kHz.

5. The processor according to claim 1, wherein the said range of frequencies extends to about 50 kHz.

6. The processor according to claim 1, wherein the said range of frequencies extends to about 100 kHz.

7. The processor according to claim 1, wherein the said components are converted to n-bit digital signals where n is greater than one using a sampling rate greater than the Nyquist rate.

8. The processor according to claim 1, wherein the first coefficient is variable.

9. The processor according to claim 8, further comprising means for generating the variable coefficient.

10. An audio signal processor which modifies audio signal components not only in the conventional audio frequency band but also in the range of frequencies from about the upper limit of the conventional audio band to greater than 24 kHz;

whereby the audio signal processor comprises a Delta Sigma Modulator (DSM) that receives a non-interpolated digital audio signal sampled at a frequency of at least 198 kHz;

wherein the audio components are converted to 1-bit signals using a sampling rate in the range 198 kHz to about 2.85 Mhz;

wherein said DSM is a one bit DSM for modifying the signal components; and wherein the said DSM is an nth order (where n is greater than or equal to 1) Delta Sigma Modulator (DSM) having a first input for receiving a first 1-bit signal, a second input for receiving a second 1-bit signal, a quantizer for requantizing a p bit signal to 1-bit from the requantized signal being the output signal of the processor, a plurality of signal combiners including a first combiner for forming an integral of an additive combination of the product of the first signal and a first coefficient and of the product of the second signal and a second coefficient and of the product of the output signal and a third coefficient, at least one intermediate combiner for forming an integral of an additive combination of the product of the first signal and a first coefficient and of the product of the second signal and a second coefficient and of the product of the output signal and a third coefficient and of the integral of the preceding stage, and a final combiner for forming an additive combination of the product of the first signal and a first coefficient and of the product of the second signal and a second coefficient and of the integral of the preceding stage to form the said p bit signal which is requantized by the quantizer.

11. The processor according to claim 10, wherein the said first coefficients and the said second coefficients are chosen to combine the first and second signals in proportions defined by the first and second coefficients.

12. The processor according to claim 10, wherein the third coefficients are chosen to provide noise shaping.

13. The processor according to claim 10, wherein the first and second coefficients are fixed.

14. The processor according to claim 10, comprising means for synchronising the bits of the first and second signals at the first and second inputs to a local clock which controls the clocking of the DSM.

15. The processor according to claim 10, wherein the second coefficient is variable.

16. The processor according to claim 15, further comprising means for generating the variable coefficient.

* * * * *